United States Patent
Vempati et al.

(10) Patent No.: US 8,478,261 B2
(45) Date of Patent: Jul. 2, 2013

(54) PREDICTIVE WAKEUP FOR PUSH-TO-TALK-OVER-CELLULAR (POC) CALL SETUP OPTIMIZATIONS

(75) Inventors: Brahmananda R. Vempati, Dallas, TX (US); Krishnakant M. Patel, Richardson, TX (US); Pratap Chandana, Plano, TX (US); Anand Narayanan, Plano, TX (US); Ravi Ayyasamy, Richardson, TX (US); Bruce D. Lawler, Kirkwood, CA (US); Basem A. Ardeh, Plano, TX (US); Ramu Kandula, Bangalore (IN); Gorachand Kundu, Bangalore (IN); Ravi Shankar Kumar, Plano, TX (US); Bibhudatta Biswal, Dallas, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 166 days.

(21) Appl. No.: 13/093,542

(22) Filed: Apr. 25, 2011

(65) Prior Publication Data

US 2011/0294494 A1    Dec. 1, 2011

Related U.S. Application Data

(60) Provisional application No. 61/347,217, filed on May 21, 2010.

(51) Int. Cl.
*H04W 52/02* (2009.01)

(52) U.S. Cl.
USPC .......................... 455/422.1; 455/518; 455/519

(58) Field of Classification Search
USPC ............. 455/403, 414.1, 22.1, 517, 518, 519; 370/276, 277, 297
See application file for complete search history.

(56) References Cited

U.S. PATENT DOCUMENTS

| | | |
|---|---|---|
| 3,912,874 A | 10/1975 | Botterell et al. |
| 4,796,293 A | 1/1989 | Blinken et al. |

(Continued)

FOREIGN PATENT DOCUMENTS

| | | |
|---|---|---|
| GB | 2338150 | 12/1999 |
| JP | 2003-92776 | 3/2003 |

(Continued)

OTHER PUBLICATIONS

International Search Report mailed Aug. 17, 2011, International application No. PCT/US2011/033791, International filing date Apr. 25, 2011.

(Continued)

*Primary Examiner* — Cong Tran
(74) *Attorney, Agent, or Firm* — Gates & Cooper LLP

(57) ABSTRACT

A predictive wakeup function for Push-to-Talk-over Cellular (PoC) call setup optimizations in a cellular mobile phone network. In performing the predictive wakeup for call setup optimizations, an originating mobile transmits an event trigger to a real-time exchange that interfaces to a mobile switching center in the cellular mobile phone network. The real-time exchange transmits a wakeup message to one or more terminating mobiles of predicted participants, in order to transition the terminating mobiles of the predicted participants from a dormant state to an active state prior to a call being setup with the terminating mobiles of the predicted participants. The terminating mobiles of the predicted participants are identified by a predictive wakeup mechanism before the originating mobile sends a list of one or more terminating mobiles of actual participants to the real-time exchange. The predicted participants may be determined based on static or dynamic information, including heuristics involving calling patterns.

24 Claims, 5 Drawing Sheets

U.S. PATENT DOCUMENTS

| | | | |
|---|---|---|---|
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,987,318 | A | 11/1999 | Alperovich et al. |
| 5,987,331 | A | 11/1999 | Grube et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,661,878 | B1 | 12/2003 | Mirashrafi et al. |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,996,414 | B2 | 2/2006 | Vishwanathan et al. |
| 7,026,926 | B1 | 4/2006 | Walker, III |
| 7,043,266 | B2 | 5/2006 | Chaturvedi et al. |
| 7,085,364 | B1 | 8/2006 | Ahmed et al. |
| 7,099,291 | B2 | 8/2006 | Harris et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,366,535 | B2 | 4/2008 | Glass et al. |
| 7,403,775 | B2 | 7/2008 | Patel et al. |
| 7,529,557 | B2 | 5/2009 | Farrill |
| 7,689,238 | B2 | 3/2010 | Biswas et al. |
| 7,738,861 | B2 * | 6/2010 | Fournier ............... 455/415 |
| 7,738,892 | B2 | 6/2010 | Ayyasamy et al. |
| 7,738,896 | B2 | 6/2010 | Patel et al. |
| 7,751,348 | B2 * | 7/2010 | Shaffer et al. ............ 370/260 |
| 7,764,950 | B2 | 7/2010 | Patel et al. |
| 7,787,896 | B2 | 8/2010 | Kundu et al. |
| 7,813,722 | B2 | 10/2010 | Patel et al. |
| 7,853,279 | B2 * | 12/2010 | Patel et al. ............... 455/518 |
| 2001/0005372 | A1 | 6/2001 | Cave et al. |
| 2002/0077136 | A1 | 6/2002 | Maggenti et al. |
| 2002/0086659 | A1 | 7/2002 | Lauper |
| 2002/0102989 | A1 | 8/2002 | Calvert et al. |
| 2002/0196781 | A1 | 12/2002 | Salovuori |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0148779 | A1 | 8/2003 | Aravamudan et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0152441 | A1 | 8/2004 | Wong |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 | 5/2005 | Lee |
| 2005/0111430 | A1 | 5/2005 | Spear et al. |
| 2005/0143135 | A1 | 6/2005 | Brems et al. |
| 2005/0164737 | A1 | 7/2005 | Brown |
| 2005/0189337 | A1 | 9/2005 | Baune |
| 2005/0192041 | A1 | 9/2005 | Oxley et al. |
| 2005/0202807 | A1 | 9/2005 | Ayyasamy et al. |
| 2005/0221819 | A1 | 10/2005 | Patel et al. |
| 2005/0232241 | A1 | 10/2005 | Wu et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0003751 | A1 | 1/2006 | Vo |
| 2006/0019654 | A1 | 1/2006 | Farrill |
| 2006/0029189 | A1 | 2/2006 | Patel et al. |
| 2006/0030347 | A1 | 2/2006 | Biswas |
| 2006/0056361 | A1 | 3/2006 | Jiang et al. |
| 2006/0078064 | A1 | 4/2006 | Schmidt et al. |
| 2006/0094455 | A1 | 5/2006 | Hannu et al. |
| 2006/0116150 | A1 | 6/2006 | Bhutiani |
| 2006/0128411 | A1 | 6/2006 | Turcanu |
| 2006/0178138 | A1 * | 8/2006 | Ostroff et al. ............. 455/426.1 |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |
| 2007/0190984 | A1 | 8/2007 | Ayyasamy et al. |
| 2007/0197234 | A1 | 8/2007 | Gill et al. |
| 2007/0217591 | A1 | 9/2007 | Yasuma |
| 2007/0253347 | A1 | 11/2007 | Patel et al. |
| 2008/0064364 | A1 | 3/2008 | Patel et al. |
| 2009/0092116 | A1 | 4/2009 | Jiang et al. |
| 2009/0119678 | A1 | 5/2009 | Shih et al. |
| 2009/0149167 | A1 | 6/2009 | Patel et al. |
| 2009/0209235 | A1 | 8/2009 | Lawler et al. |
| 2009/0325540 | A1 | 12/2009 | Yach et al. |
| 2010/0142414 | A1 * | 6/2010 | Patel et al. ............... 370/277 |
| 2010/0234018 | A1 | 9/2010 | Lawler et al. |
| 2011/0151917 | A1 * | 6/2011 | Mao et al. ............... 455/519 |
| 2011/0250923 | A1 * | 10/2011 | Miller et al. ............ 455/518 |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 02101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/048217 | 4/2010 |
| WO | 2010/117815 | 10/2010 |

OTHER PUBLICATIONS

ETSI "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

TrachWell: "TrackWell Software and Tetra Iceland deliver value added services to Tetra users", Trackwell.Com, Oct. 2002, pp. 1-1. XP002345781 http://www.trackwell.com/news/news_twandtetra.htm.

* cited by examiner

PREDICTIVE WAKEUP FOR PUSH-TO-TALK-OVER-CELLULAR (POC) CALL SETUP OPTIMIZATIONS

CROSS REFERENCE TO RELATED APPLICATIONS

This application claims the benefit under 35 U.S.C. Section 119(e) of the following and commonly-assigned patent application:

U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (POC) CALL SETUP OPTIMIZATIONS,";

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS,", which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK,", now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS,", now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS,", now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,", which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE,", which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS,", now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM,", which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM,", now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS,", which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK,", which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION,", which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS,", which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION,", which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK,", which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK,", which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK,", which application claims the benefit under 35 U.S.C. Section 119(e) of U.S. Provisional Application Ser. No. 61/310,245;

all of which applications are incorporated by reference herein.

BACKGROUND OF THE INVENTION

1. Field of the Invention

This invention relates in general to mobile phone networks, and more specifically, to predictive wakeup for push-to-talk-over-cellular (PoC) call setup optimizations in a mobile phone network.

2. Description of Related Art

Advanced voice services (AVS), also known as Advanced Group Services (AGS), such as two-way half-duplex voice calls within a group, also known as Push-to-Talk-over-cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

Currently, there are two major approaches employed in providing advanced voice services in wireless communications systems. One approach is based on circuit-switched technology, wherein voice circuits are reserved during the entire duration of an AVS or PoC call. Circuit-switched PoC is deployed by many operators around the world with technologies such as NEXTEL's iDEN and Kodiak Network's RTX.

Another approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

In either approach, an effective PoC implementation requires PoC session setup times of less than 2 seconds for acceptable performance. In practice, these setup times are difficult to achieve in view of inherent network parameters. For example, to conserve handset battery life, networks are tuned such that handset terminals are put in battery conserving sleep mode and will "wakeup" periodically to listen to the paging channel. This results in inherent delays of longer than 2 seconds in setting up of PoC sessions, which is unacceptably long.

Thus, there is a need in the art for improvements to the methods and systems for delivering the advanced voice services, such as PoC, that comply with both existing circuit-based networks and emerging wireless packet-based standards and yet provide superior user experiences by reducing PoC call setup times to within acceptable limits. The present invention satisfies this need.

SUMMARY OF THE INVENTION

To overcome the limitations in the prior art described above, and to overcome other limitations that will become apparent upon reading and understanding the present specification, the present invention discloses a predictive wakeup for Push-to-Talk-over-Cellular (PoC) call setup optimizations for use in wireless communications networks, such as cellular mobile phone networks.

Predictive wakeup is a mechanism wherein originating and terminating parties in a PoC session are moved from a dormant radio channel state to an active channel to achieve faster session setup. Wakeup mechanisms are "predictive" since the actual participants in the session are not known at the time of wakeup initiation.

In performing the predictive wakeup for call setup optimizations, an originating mobile transmits an event trigger to a real-time exchange, and the real-time exchange transmits a wakeup message to one or more terminating mobiles of predicted participants, in order to transition the terminating mobiles of the predicted participants from a dormant state to an active state prior to a PoC call being setup with the terminating mobiles of the predicted participants. The event trigger may be transmitted from the originating mobile in any of the following events, or combination thereof, such as when: a user logs into a client on the originating mobile; a user navigates a contact list; a user selects one or more contacts or groups from the contact list; a user navigates a call history; a user selects one or more entries from the call history, a user presses a PoC button on the handset, a user performs some other activity on the handset, etc.

The predicted participants may be determined based on static or dynamic information. In one embodiment, the participants may be determined based on heuristics involving real-time calling patterns, which include: all time most used contacts, most recently used contacts, time of day most used contacts, last used contacts, contacts involved in long duration of sessions, incoming or outgoing direction of sessions with contacts, incoming Instant Personal Alerts, level of activity of contacts, or active participants in a group call.

The terminating mobiles of the predicted participants are identified by a predictive wakeup mechanism before the originating mobile sends a list of one or more terminating mobiles of actual participants to the real-time exchange. When the list of the terminating mobiles of the actual participants is received, the real-time exchange sets up PoC sessions to the terminating mobiles of the actual participants. Since the participants in the session have been transitioned from a dormant state to an active state by the prior wakeup messages that were sent by the real-time exchange, the overall set up time to establish PoC sessions is considerably reduced.

The predictive wakeup mechanism includes one or more algorithms performed by a processor that derive the list of predicted participants, wherein these algorithms can be client-based or server-based. Client-based algorithms derive the list of participants based on client actions on the mobile. Server-based algorithms may derive the same or a different list of predicted participants based on the same information or server-based information not available to a client-based algorithm. Also, a server-based algorithm eliminates the need for the client on the mobile to implement complex algorithms, resulting in less complexity and hence cost.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

This invention relates in general to mobile phone networks, and more specifically, to predictive wakeup for call setup optimizations in a mobile phone network. In one embodiment, the predictive wakeup mechanism of the present invention is used with a Push-to-Talk-over-Cellular (PoC) call for wireless networks, although it may be used for other advanced voice services as well.

Network Architecture

Figure 1:
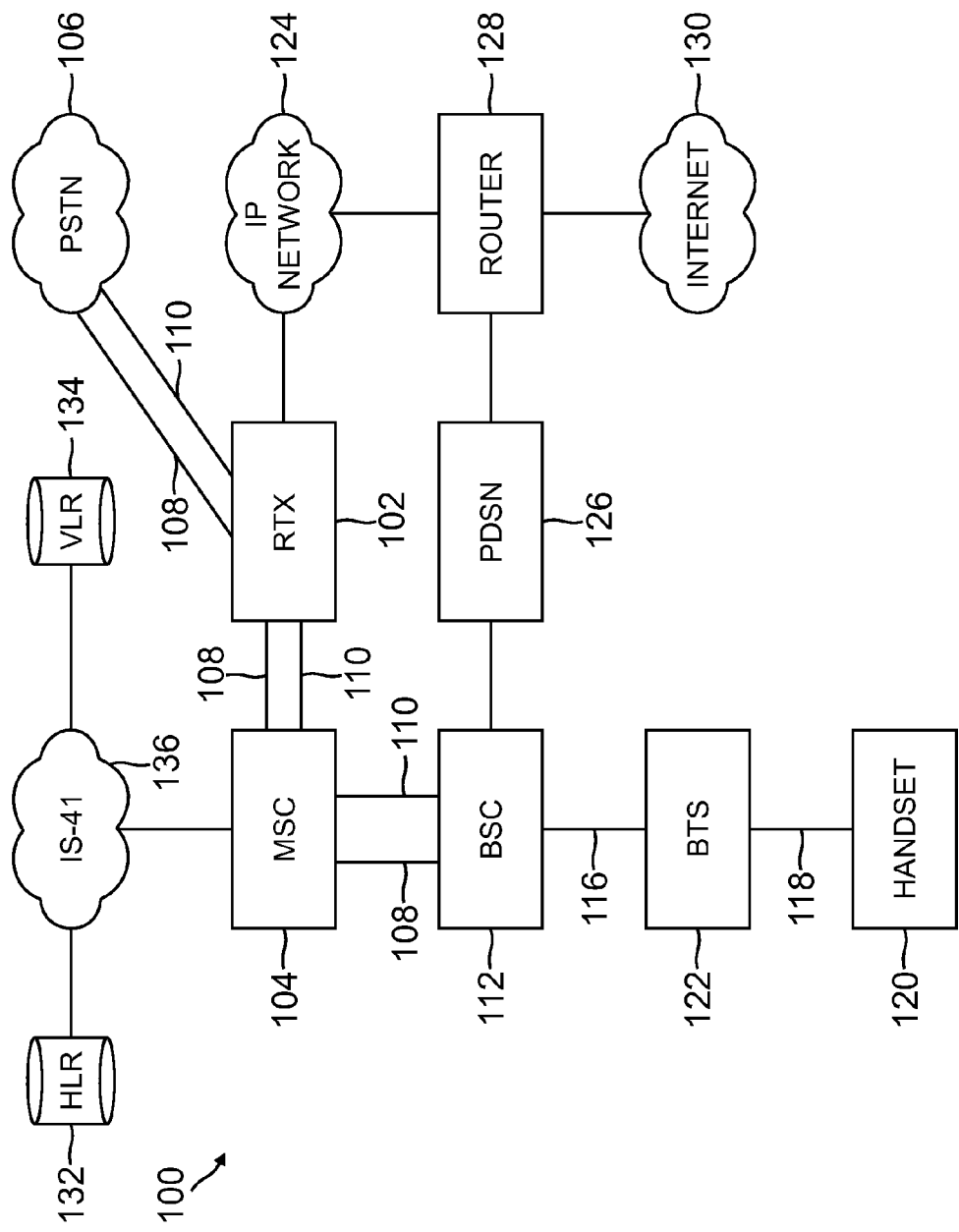
FIG. 1 is a block diagram that illustrates an exemplary embodiment of a wireless communications network according to a preferred embodiment of the present invention.

FIG. 1 is a block diagram that illustrates an exemplary embodiment of a wireless communications network (also known as a cellular phone network or mobile phone network or simply a mobile communications network) according to a preferred embodiment of the present invention.

Within the network 100, an RTX (Real-Time Exchange) 102, previously known as a Dispatch Gateway (DG), also known as a PoC Server, communicates with a MSC (Mobile Switching Center) 104 and PSTN (Public Switched Telephone Network) 106 using SS7-ISUP/WIN/CAMEL (Signaling System 7-Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile 120 (also known as a mobile station, mobile unit, mobile phone, cellular phone or handset) via the BTS (Base Transceiver Station) 122 (as it does for a normal cellular call).

At the same time (after the MSC 104 terminates the group call request to the RTX 102), the RTX 102 identifies the terminating group users and their numbers, which may comprise an MS-ISDN (Mobile Station—Integrated Services Digital Network) number, an IMSI (International Mobile Subscriber Identity) number, or an MDN (Mobile Directory Number).

The RTX 102 sends an ISUP call origination request for each terminating mobile 120. It may send requests directly to the MSC 104, PSTN 106 or IP network 124 via a PDSN (Public Data Switched Network) 126, Router 128, and/or Internet/Intranet 130, depending on the routing table configuration for terminating numbers. Once the bearer path 110 is established, the RTX 102 begins a negotiation with the far end (in this case, the terminating BSC 112) for each terminating leg to a mobile 120.

Once bearer paths 110 are established for originating and terminating legs for an AVS call, the RTX 102 switches (or duplicates) voice or data from the originating mobile 120 to all terminating mobiles 120.

The RTX 102 may also use an IP network 124 or the Internet/Intranet 130. For example, the IP network 124 or the Internet/Intranet 130 can be used in a toll bypass mode where two RTXs 102 can exchange voice and signaling traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for PoC, registration, presence and other applications, such as the predictive wakeup for PoC call setup as described in more detail below. For example, such applications may run over an IP stack in the mobile 120. After the mobile 120 registers for a data interface (i.e., obtaining an IP address) with the PDSN 126 (or equivalently, an SGSN (Serving GPRS Support Node) or GGSN (Gateway GPRS Support Node) in the case of GSM networks, or a PDSN (Packet Data Service Node) in the case of CDMA networks), or a MME (Mobility Management Entity and SAE (System Architecture Evolution Gateway) in the case of LTE networks, the application in the mobile 120 registers with the RTX 102 using its IP address. The RTX 102 also uses this IP interface during the applications' sessions.

An alternative embodiment would use the SMS (Short Message Service) transport to carry messages over a data channel. The RTX 102 interacts with the mobile 120 using predefined application related messages that are transported as SMS messages. The same messages can be transported via the PDSN 126, or other IP network 124 or Internet/Intranet 130 interfaces (e.g., SGSN, GGSN, MME interfaces), if such interfaces are supported.

During roaming, an HLR (Home Location Register) 132 and VLR (Visitor Location Register) 134 can be accessed via the MSC 104 and an IS-41 link 136. The HLR 132 and VLR 134 are used to track the presence of members of a group within home or foreign networks and updates the mobiles 120 for those members with the network availability of other members of the group.

Real Time Exchange

Figure 2:
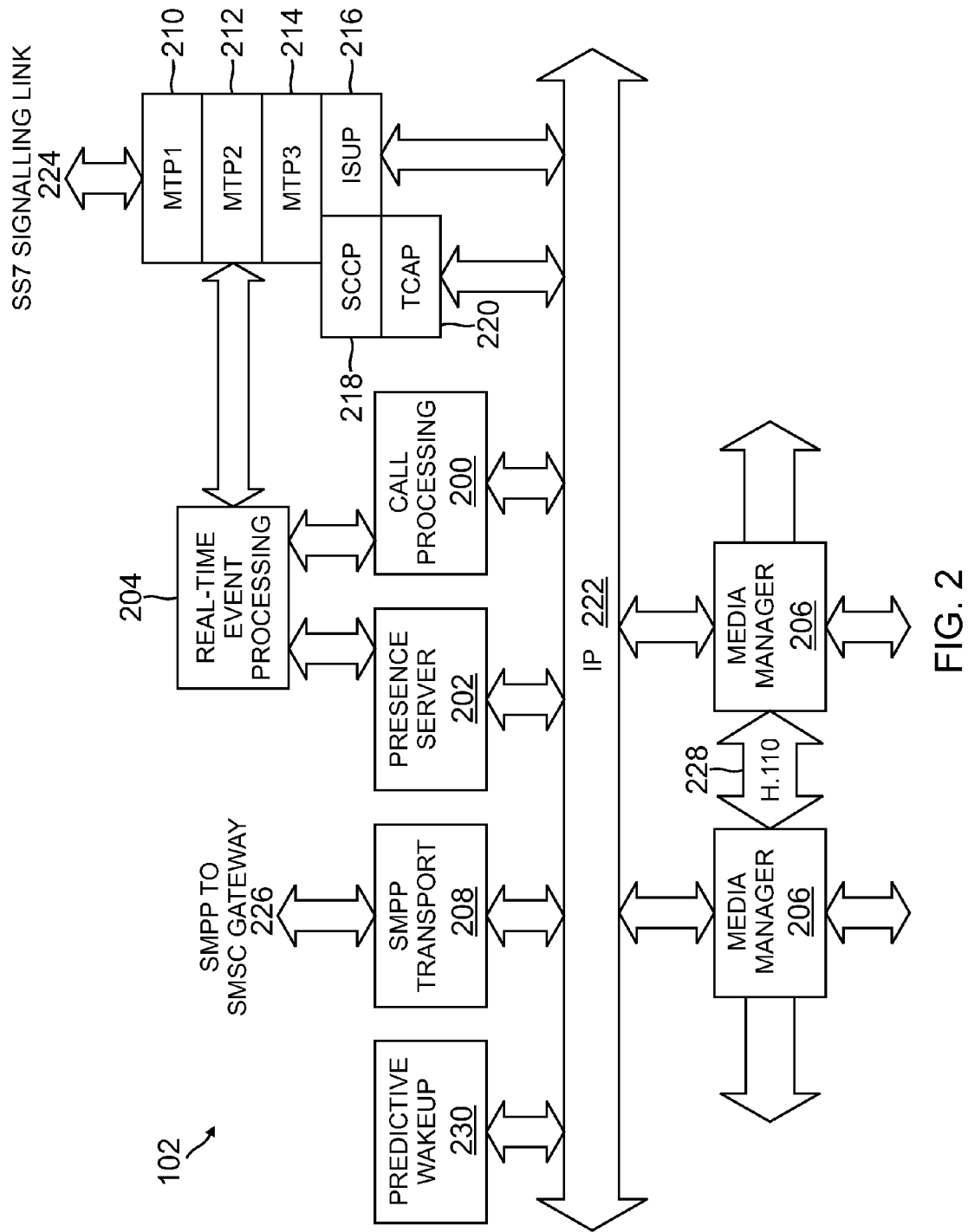
FIG. 2 illustrates a proposed architecture for a Real-Time Exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols. Alternatively, the modules 210-220 may implement other protocols, such as IP protocols, for use, for example, in VoIP calls or sessions.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 or other protocols, such as IP.

The operation of these various components are described in more detail below, as well as in the co-pending and commonly-assigned patent applications cross-referenced above and incorporated by reference herein.

The architecture also includes a Predictive Wakeup function 230, which is used for performing a predictive wakeup algorithm for PoC call setup optimizations, as described in more detail below.

The originating mobile 120 signals the RTX 102 via the wireless network 100, e.g., by transmitting one or more configured DTMF (Dual Tone Multi Frequency) digits to the RTX 102 or include the invitees as part of the SIP messaging over pre-established SIP sessions. For circuit-switched PoC, the Media Manager systems 206 receive the DTMF digits and pass the DTMF digits to the Call Processing system 200. In the case of packet-switched PoC, the Call Processing system 200 receives the invitee list from the mobile 120 client via SIP signaling. The Call Processing (CP) system 200 determines whether the originating mobile 120 has subscribed to the AVS feature before initiating the terminating AVS call. Upon confirmation, the Call Processing system 200 initiates a new terminating AVS call. The Call Processing system 200 interacts with the Presence Server 202 and Real-Time Event Processing system 204 to cause the wireless network 100 to perform call setup with the terminating mobiles 120 for the AVS call, and thereafter to manage the AVS call.

Call Processing system 200 interacts with the Media Manager systems 206 to maintain the RTP ports or H.110 channels 227 and assign any additional H.110 channels 228 or inter-media server ports required for the AVS call, which may span across multiple Media Manager systems 206. During the AVS call, the Media Manager systems 206 of the RTX 102 are used to mix audio streams between the originating mobile 120 and the terminating mobile 120, and then deliver these mixed audio streams to the originating mobile 120 and the terminating mobile 120. The H.110 channels 228 or inter-media server ports are used for passing mixed and unmixed audio streams voice between the Media Manager systems 200 as required.

The Call Processing system 200 interacts with the Predictive Wakeup function 230 to update call pattern information. Call pattern information gathered as part of call processing is used by the Predictive Wakeup function 230 to determine the list of terminating entities that need to be transitioned from a "dormant" to an "active" state as part of the predictive wakeup for PoC call setup optimizations.

Mobile Components

Figure 3:
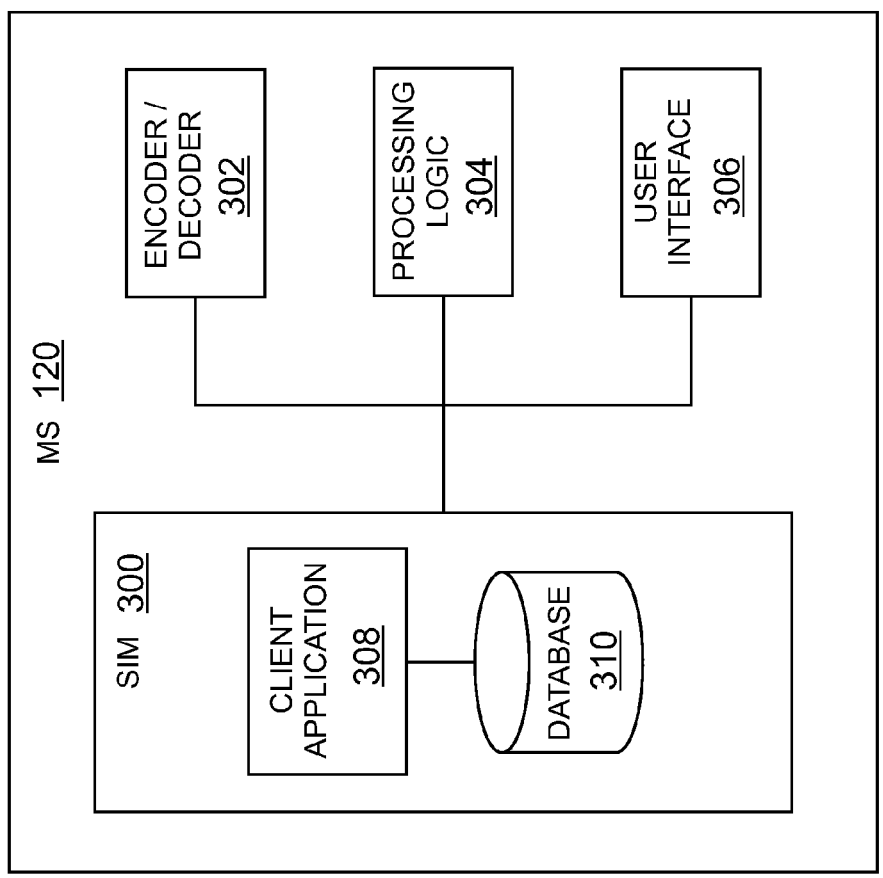
FIG. 3 illustrates the high-level functional components and their interfaces in a mobile station or handset according to a preferred embodiment of the present invention.

FIG. 3 illustrates the high-level functional components and their interfaces in the mobile 120 according to a preferred embodiment of the present invention.

Preferably, the mobile 120 includes a Subscriber Identity Module (SIM) 300 that is inserted into the mobile 120 to provide the wireless phone service. The SIM 300 stores some of the logic and data required of the mobile 120 for providing cellular service, including the functions necessary for supporting AVS functionality, namely both PoC calls and predictive wakeup for PoC calls, as well as other AVS functionality. In addition, the SIM 132 stores contact and group information, and other user information for use by the mobile 120.

The high-level functional components of the mobile 120 include an encoder/decoder 302, processing logic 304 and user interface 306. A client application 308 is provided on the SIM 300 that supports the AVS functionality for the mobile 120. In addition, the SIM 300 stores a database 310, which includes an address book, AVS contacts and/or group information.

At power-on, the mobile 120 loads the client application 308 necessary to support the AVS functionality. This functionality provided includes the "look and feel" of the menu displays on the mobile 120, as well as user interaction with the menu displays.

During operation, the encoder/decoder 302 decodes and encodes messages, and populates specific data structures in the mobile 120. The encoder/decoder 302 checks the validity of the incoming messages by verifying mandatory parameters for each of the incoming messages. A message will not be processed further if the encoder/decoder 302 fails to decode the message.

The processing logic 304 handles all the AVS functionality. The processing logic 304 implementation is device-specific and vendor-specific, and it interacts with the other components, including the encoder/decoder 302, user interface 306, client application 308 and database 310.

The processing logic 304 provides an auto-answer mechanism for the AVS functionality. Specifically, when a call is received, the processing logic 304 automatically answers the call. The processing logic 304 makes use of call notification for incoming call detection and, based on various parameters received within the call notification, determines whether the call is an AVS call. If the call is an AVS call, then the processing logic 304 uses "AT" commands to answer the AVS call and turn on the speaker of the mobile 120. (All of this takes place within a certain time period.) On the other hand, if the call is not an AVS call, then normal call processing is performed by the mobile 120.

The processing logic 304 also provides "floor control" using DTMF tone control or MBCP (Media Burst Control Protocol) via RTCP (Real-time Transport Control Protocols). In PoC calls, which are half-duplex, a determination of who may talk is based on who has the "floor." Using the processing logic 304 provided in the mobile 120, appropriate DTMF tones or MBCP floor control messages are sent to the RTX 102 in accordance with specific key sequences (i.e., pressing and/or releasing a PoC key) that indicate whether the "floor" has been requested and/or released by the user.

In addition, the processing logic 304 provides SMS destination control based on the type of subscriber. At the time of subscriber data provisioning, if it is determined that the mobile 120 will use AVS based logic, then appropriate logic is invoked in the RTX 102 to send presence messages over SMS to the mobile 120 or using SIP messages. Similarly, the mobile 120 is configured at the time of provisioning to receive/accept such SMS and respond to the RTX 102 appropriately.

Finally, the processing logic 304 also enables subscribers to track the presence of fellow members of the group in the network 100 on their mobile 120, and provides a mechanism and API to carry-out contacts and group management operations on the mobile 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, configuration parameters, etc. The other components of the mobile 120 may interact with the database 310 to retrieve/update the group, members and presence information for various operations. The database 310 also has pointers to the native address book on the mobile 120, to provide seamless "alias" naming for contacts used with cellular calls, as well as AVS features.

The user interface 306 provides a mechanism for the user to view and manage groups, group members, contacts, presence and availability. The user interface 306 also makes it possible to invoke the AVS features from the group/contact list screens, as described in more detail below.

Predictive Wakeup for PoC Setup Optimization

An effective PoC implementation requires call or session setup times among participants to be in order of approximately ~1 second. In practice, these setup times are hard to achieve, since the underlying network parameters place inherent (and natural) restrictions on how fast call setup can be performed. For example, networks 100 are tuned to conserve the battery life of mobiles 120 by dictating how often they wakeup to listen to the paging channels. Moreover, these network 100 settings cannot be compromised to cater to the needs of one application, such as PoC, at the expense of network 100 wide impacts on all users' experiences. As a result, inherent delays are introduced in the call setup.

The present invention implements call setup for PoC based on a "predictive wakeup" that allows for faster call setup. Predictive wakeup is a mechanism where originating and terminating mobiles 120 in a PoC call may be moved from a dormant state to an active state prior to call setup. The wakeup mechanisms are "predictive" since the actual participants in the call are not known at the time the predictive wakeup mechanism is performed, and thus the predictive wakeup mechanisms determine the predicted participants for the call, rather than the actual participants.

In one embodiment, the predictive wakeup mechanism is initiated as a result of any of the following trigger events on the originator's side, including, but not limited to, the following triggering events:

Browsing or navigating contacts or groups or call history on the mobile 120.

Selecting contacts, groups, or previous calls on the mobile 120 (e.g., check box selection or the equivalent in touch-screen devices).

Launching the client 308 on the mobile 120.

Pressing the PoC button on the mobile 120.

Performing any user activity on the mobile 120.

During any one of these trigger events, and based on heuristics involving previous calling patterns, or other dynamic or static information, a set of predicted participants for a particular PoC session may be derived before actual participants are known, and "wakeup messages" may be sent to transition the terminating mobiles for these predicted participants from a dormant state to an active state to handle any incoming call setups.

Figure 4:
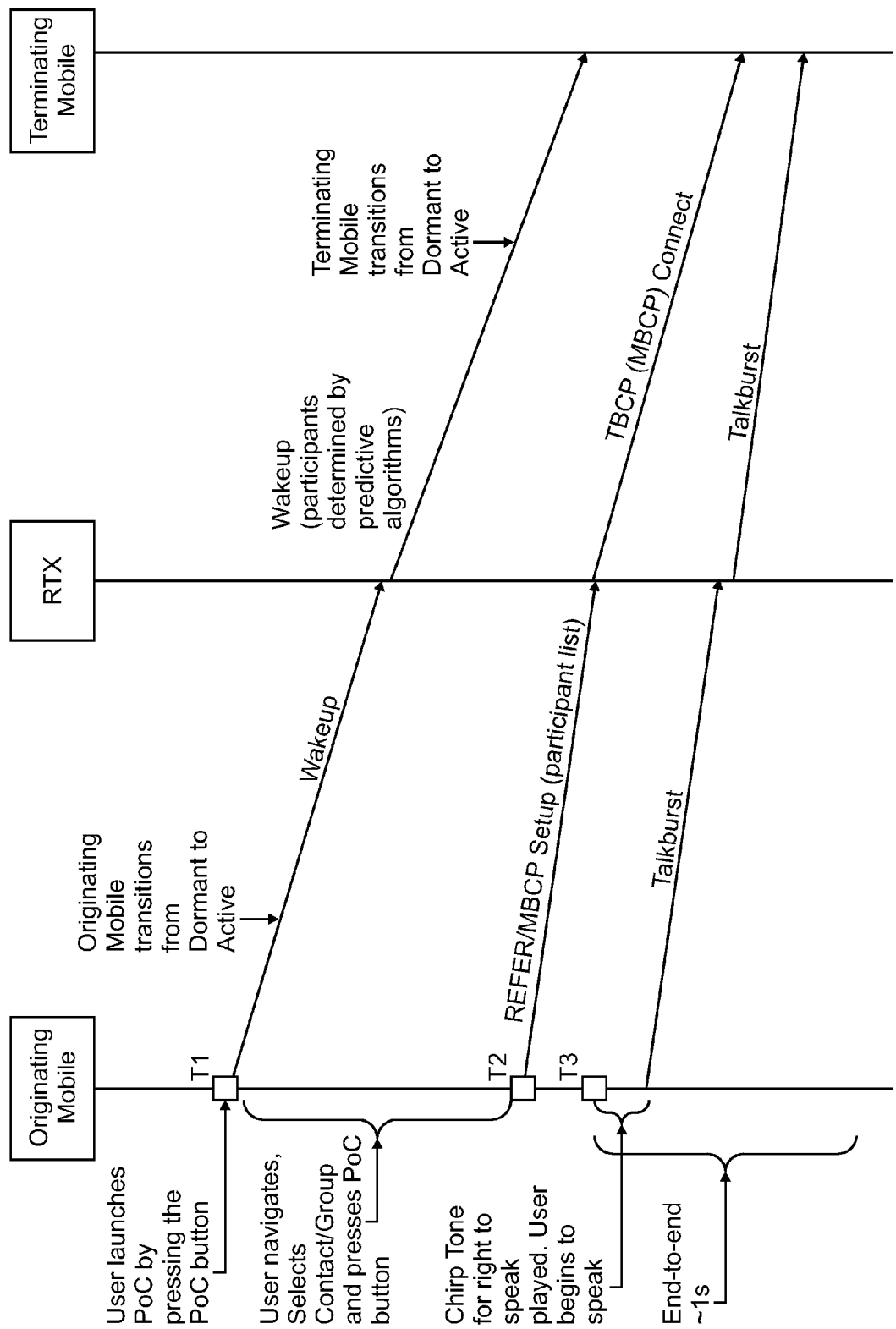
FIGS. 4 and 5 are flowcharts that illustrate the end-to-end setup times for establishing the PoC call using predictive wakeup.

FIG. 4 is a flowchart that illustrates the end-to-end sequence for establishing the PoC call using predictive wakeup.

1. At T1, the user launches the PoC client 308 by pressing a PoC button on the originating mobile 120, which results in the PoC client 308 sending an event trigger, in this example, a "wakeup" message, to the RTX 102, over the pre-established IP session. This wakeup message transitions the originating mobile 120 from a dormant state to an active state.

Note, however, as mentioned above, the event trigger may comprise browsing or navigating contacts, groups, or call history on the mobile 120, selecting contacts, groups or previous calls on the mobile 120, as well as the launching of the PoC client 308 on the mobile 120, or the pressing of the PoC button on the mobile 120, or other user actions on the mobile 120. Moreover, the event trigger may comprise a message other than the wakeup message.

In response to the event trigger, the Predictive Wakeup function 230 of the RTX 102 performs a predictive wakeup algorithm to determine the predicted participants. Alternatively, the Predictive Wakeup function 230 of the RTX 102 receives a message with the predicted participants as determined by the mobile 120, which may perform a predictive wakeup algorithm. The Predictive Wakeup function 230 of the RTX 102 then sends a "wakeup" message to each of the terminating mobiles 120 for the predicted participants, so that the terminating mobiles 120 also transition from a dormant state to an active state.

2. Between T1 and T2, the user browses or navigates contacts, groups or call history on the mobile 120, selects the desired contacts, groups or calls, and presses the PoC button on the mobile 120.

3. At T2, the PoC client 308 sends a "REFER/MBCP Setup" (SIP REFER/Media Burst Control Protocol Setup) message to the RTX 102, which includes an actual participant list. The RTX 102 then sends a "TBCP (MBCP) Connect" (Talkburst Control Protocol (Media Burst Control Protocol) Connect) message to each of the terminating mobiles 120 for the actual participants.

4. At some point following T2, a chirp tone is received at the originating mobile 120 at T3, indicating that the user has the "floor" for the call, and thus the right to speak, and the user begins to speak.

Figure 5:
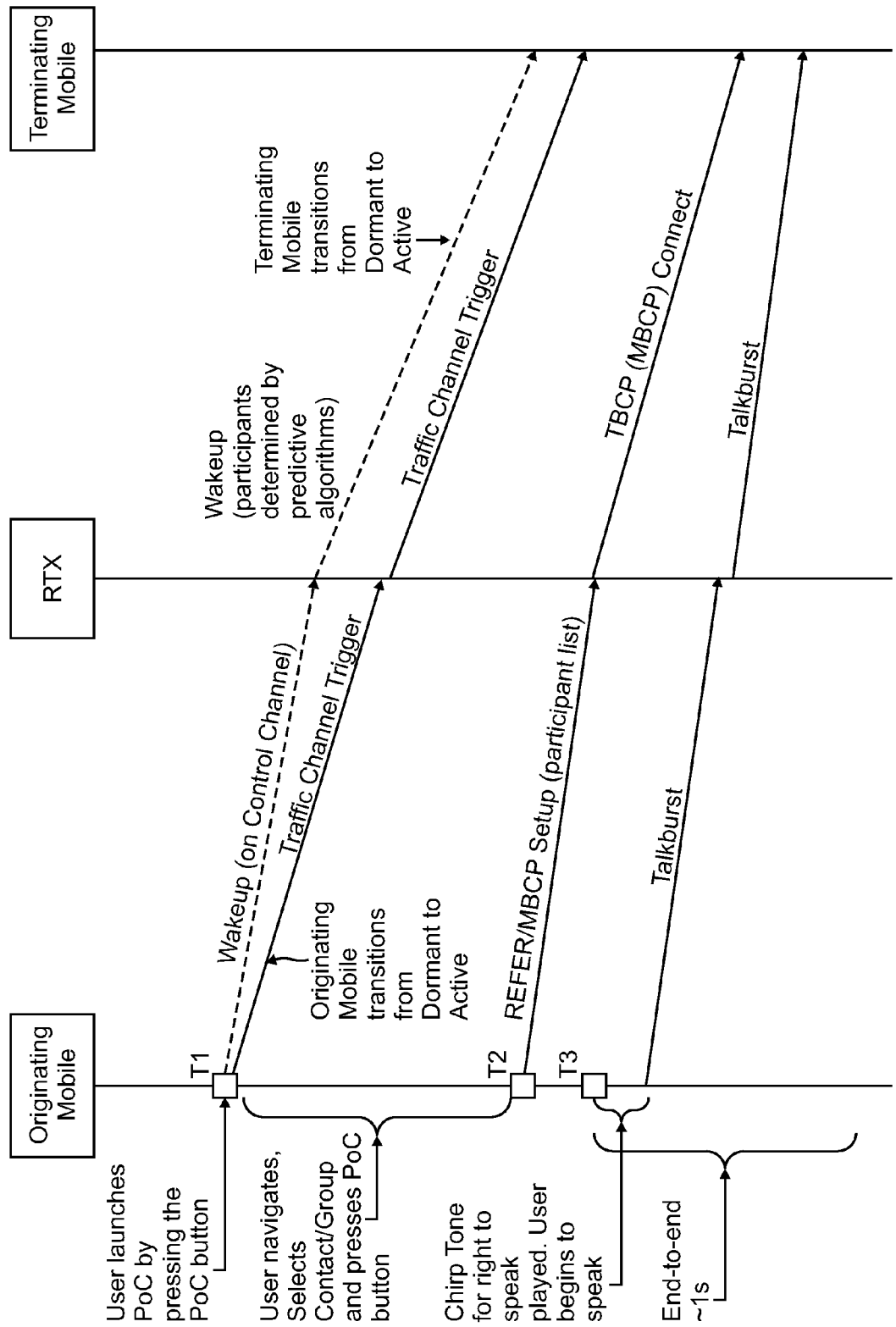

FIG. 5 is a flowchart that illustrates an alternative end-to-end sequence for establishing the PoC call using predictive wakeup. The difference between this sequence and the sequence of FIG. 4 is that the wakeup message in FIG. 5 is transmitted to the RTX 102 over a Control Channel at T1, rather than waiting for a Traffic Channel to be setup. This allows the wakeup message to be transmitted to the RTX 102 faster and allows the terminating mobiles 120 to be awakened faster. Note that a separate Traffic Channel trigger message, transmitted by the PoC client 308 before or after the wakeup message at or about T1, transitions the originating mobile 120 to a dedicated Traffic Channel state, while the PoC client 308 on the terminating mobile 120 also sends a Traffic Channel trigger message to the RTX 102, in response to receipt of the wakeup message, between T1 and T2, to transition the terminating mobile 120 to a Traffic Channel state. The remaining portions of FIG. 5 are the same as FIG. 4.

The predictive wakeup mechanism includes one or more algorithms performed by a processor that derive the list of predicted participants, wherein these algorithms can be client-based (i.e., originating mobile 120) or server-based (i.e., RTX 102 or another server in the network 100). While both approaches are possible, server-based predictive wakeup algorithms have a number of advantages over client-based predictive wakeup algorithms:

(1) The server-based approach can include server-based information beyond the knowledge of the originating client 308 to predict the participant list.

(2) The server-based approach eliminates the need for clients 308 to implement complex algorithms, and instead simply requires that a trigger message be sent from the mobile 120 to the RTX 102 to initiate the predictive wakeup mechanism.

The following describes some proposed implementations of the predictive wakeup algorithms:

Let C be the finite set of all Contacts belonging to a subscriber.

Then, T a subset of C is derived by predictive algorithms such that the cardinality of $T \leq N$, where N is configured to limit the total usage of network resources, N can be a system wide configuration, or N is a fraction of the contact list size (e.g., $|T|/|C| \leq N$).

Note that T may also be ordered based on the number of occurrences of calls to and/or from a particular contact, such that the first "i" entries of this ordered list corresponds to a probability of call completion.

For example, a list of all numbers called and their frequency over some time period (e.g., 7 days) may be stored in a memory or a data storage device. The processor can then calculate how many numbers and which numbers need to be "woken up" to achieve some predefined probability of success (e.g., 95%) for the predictive wakeup mechanism.

Consider, the example illustrated in the Table below:

| Called number | Frequency of calls over time period |
|---|---|
| 1234 | 11 |
| 1235 | 9 |
| 1236 | 8 |
| 1237 | 7 |
| 1238 | 6 |
| 1239 | 5 |
| 1240 | 4 |
| 1241 | 3 |
| 1242 | 1 |
| 1243 | 1 |
| | Total = 55 |

To achieve a 95% probability of success, the predictive wakeup mechanism would need to wake up the first 8 called numbers, i.e., 95%*55=52.25

Generally, the predictive wakeup algorithms can use any heuristics involving calling patterns or other dynamic or static information:

Dynamic information.

Static Information.

Heuristics involving calling patterns:
 All time most used contacts,
 Most recently used contacts,
 Time of day most used contacts,
 Last used contacts,
 Contacts involved long duration of sessions,
 Direction (incoming or outgoing) of sessions with contacts,
 Level of activity of contacts (independent of the originator),
 Active participants in a group call, or
 Instant Personal Alerts (IPAs).

Other heuristics may be used as well, and the above list is not intended to be exhaustive.

The details of these heuristics are described in more detail below.

All Time Most Used Top X
 Contacts or groups (accumulated over a lifecycle of PoC service for an user).
Most Recently Used Top X
 Contacts or groups (within a given time frame, for example, a month).
Time of Day Most Used Top X
 Contacts or groups based on time of the day (for example, Top X during 8 AM to 10 AM, 10 AM to 3 PM, 3 PM to 6 PM, 6 PM to 8 AM could be different).
 The number of slots in a day and slot start/end time are configurable.
 This can be used in combination with All Time Most Used Contacts or Most Recently Used Contacts.
Last Used Top X
 Last used Top X contacts or groups.
Top X
 The criteria or rules to determine the Top X are configurable.
 Absolute minimum number of calls made to a contact or group. This may be a network wide configuration. Once the number of calls to a contact or group reaches this threshold, it gets into the Top X.
 Relative usage and calls to contacts or groups as compared with other contacts or groups.
Directionality of Session Establishment
 Relative importance to contacts for incoming versus outgoing sessions.
 In this case, a supplemental wakeup list may be populated with the originator's identity for the terminator in a call.
Level of Activity of Contacts
 Independent of the originator's involvement.
Active Participants in a Group Call
 Inclusion of contacts that were active participants of a group call.
Instant Personal Alerts (IPAs)
 IPAs are alerts typically requesting a call back.
Statistical Significance
 The significance level of the call patterns is improved by applying thresholds such as a minimum number of call attempts.

A mix of different predictive wakeup algorithms may be implemented. For example, the predictive wakeup mechanism may be implemented by a mix of both static and dynamic (i.e., learning) predictive wakeup algorithms. This would allow network 100 operators to deploy PoC services based on call patterns and optimize network 100 resources. Moreover, network 100 operators can decide on what algorithms to use based on geographical area. Network 100 operators can also use the mix of algorithms to cater to a particular market segment or customer segment, and decide how to trade-off network 100 resource utilization versus speed of PoC session setup. An adaptive predictive wakeup algorithm can also result in a mix of algorithms that is selected based on the effectiveness of the algorithm.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing advanced voice services in a cellular telephone network, comprising:
 a cellular telephone network for making calls between mobiles;
 at least one real-time exchange that interfaces to the cellular telephone network to perform advanced voice services, the advanced voice services including an instant two-way half-duplex voice call within a group of users of the cellular telephone network;
 wherein an originating mobile transmits an event trigger to the real-time exchange, and the real-time exchange transmits a wakeup message to one or more terminating mobiles of predicted participants, in order to transition the terminating mobiles of the predicted participants from a dormant state to an active state prior to a call being setup with the terminating mobiles of the predicted participants; and
 wherein the terminating mobiles of the predicted participants are identified by a predictive wakeup mechanism before the originating mobile sends a list of one or more terminating mobiles of actual participants to the real-time exchange.

2. The system of claim 1, wherein the real-time exchange sets up the advanced voice services toward the terminating mobiles of the actual participants, after receiving the list of the terminating mobiles of the actual participants.

3. The system of claim 1, wherein the event trigger is transmitted from the originating mobile when a user logs into a client on the originating mobile.

4. The system of claim 1, wherein the event trigger is transmitted from the originating mobile when a user navigates a contact list.

5. The system of claim 4, wherein the event trigger is transmitted from the originating mobile when a user selects one or more contacts or groups from the contact list.

6. The system of claim 1, wherein the event trigger is transmitted from the originating mobile when a user navigates a call history.

7. The system of claim 6, wherein the event trigger is transmitted from the originating mobile when a user selects one or more entries from the call history.

8. The system of claim 1, wherein the predicted participants are determined based on static or dynamic information.

9. The system of claim 1, wherein the participants are determined based on heuristics involving calling patterns.

10. The system of claim 9, wherein the heuristics involving calling patterns include: all time most used contacts, most recently used contacts, time of day most used contacts, last used contacts, contacts involved in long duration of sessions, incoming or outgoing direction of sessions with contacts, level of activity of contacts, or active participants in a group call.

11. The system of claim 1, wherein the predictive wakeup mechanism is performed by the originating mobile.

12. The system of claim 1, wherein the predictive wakeup mechanism is performed by the real-time exchange.

13. A method of providing advanced calling services in a cellular telephone network, comprising:

making calls between mobiles in a cellular telephone network;

interfacing at least one real-time exchange to the cellular telephone network to perform advanced voice services, the advanced voice services including an instant two-way half-duplex voice call within a group of users of the cellular telephone network;

wherein an originating mobile transmits an event trigger to the real-time exchange, and the real-time exchange transmits a wakeup message to one or more terminating mobiles of predicted participants, in order to transition the terminating mobiles of the predicted participants from a dormant state to an active state prior to a call being setup with the terminating mobiles of the predicted participants; and wherein the terminating mobiles of the predicted participants are identified by a predictive wakeup mechanism before the originating mobile sends a list of one or more terminating mobiles of actual participants to the real-time exchange.

14. The method of claim 13, wherein the real-time exchange sets up the advanced voice services toward the terminating mobiles of the actual participants, after receiving the list of the terminating mobiles of the actual participants.

15. The method of claim 13, wherein the event trigger is transmitted from the originating mobile when a user logs into a client on the originating mobile.

16. The method of claim 13, wherein the event trigger is transmitted from the originating mobile when a user navigates a contact list.

17. The method of claim 16, wherein the event trigger is transmitted from the originating mobile when a user selects one or more contacts or groups from the contact list.

18. The method of claim 13, wherein the event trigger is transmitted from the originating mobile when a user navigates a call history.

19. The method of claim 18, wherein the event trigger is transmitted from the originating mobile when a user selects one or more entries from the call history.

20. The method of claim 13, wherein the predicted participants are determined based on static or dynamic information.

21. The method of claim 13, wherein the participants are determined based on heuristics involving calling patterns.

22. The method of claim 21, wherein the heuristics involving calling patterns include: all time most used contacts, most recently used contacts, time of day most used contacts, last used contacts, contacts involved in long duration of sessions, incoming or outgoing direction of sessions with contacts, level of activity of contacts, or active participants in a group call.

23. The method of claim 13, wherein the predictive wakeup mechanism is performed by the originating mobile.

24. The method of claim 13, wherein the predictive wakeup mechanism is performed by the real-time exchange.

* * * * *